US008252165B2

(12) United States Patent
Zheng et al.

(10) Patent No.: US 8,252,165 B2
(45) Date of Patent: Aug. 28, 2012

(54) METHOD FOR THE ELECTROCHEMICAL DEPOSITION OF CARBON NANOTUBES

(75) Inventors: Ming Zheng, Wilmington, DE (US); Lap-Tak Andrew Cheng, Newark, DE (US)

(73) Assignee: E I du Pont de Nemours and Company, Wilmington, DE (US)

(*) Notice: Subject to any disclaimer, the term of this patent is extended or adjusted under 35 U.S.C. 154(b) by 965 days.

(21) Appl. No.: 12/196,431

(22) Filed: Aug. 22, 2008

(65) Prior Publication Data

US 2010/0044233 A1 Feb. 25, 2010

(51) Int. Cl.
C25D 9/02 (2006.01)
C25D 9/04 (2006.01)
(52) U.S. Cl. ......... 205/109; 205/316; 313/311; 445/51
(58) Field of Classification Search .................. 205/109
See application file for complete search history.

(56) References Cited

U.S. PATENT DOCUMENTS

| 4,857,799 | A | 8/1989 | Spindt et al. | |
|---|---|---|---|---|
| 5,015,912 | A | 5/1991 | Spindt et al. | |
| 6,902,658 | B2 | 6/2005 | Tallin et al. | |
| 2002/0074932 | A1 | 6/2002 | Bouchard et al. | |
| 2004/0132072 | A1 | 7/2004 | Zheng et al. | |
| 2004/0146904 | A1 | 7/2004 | Phillips et al. | |
| 2006/0124028 | A1* | 6/2006 | Huang et al. | 106/31.92 |
| 2007/0032590 | A1* | 2/2007 | Hayashi et al. | 524/504 |
| 2008/0187666 | A1* | 8/2008 | Burglin | 427/288 |

FOREIGN PATENT DOCUMENTS

| WO | 9415350 A1 | 7/1994 |
|---|---|---|
| WO | 9415352 A1 | 7/1994 |
| WO | 9428571 A1 | 12/1994 |

OTHER PUBLICATIONS

A. R. Boccaccini et al, Electrophoretic deposition of carbon nanotubes, Carbon 44 (2006), pp. 3149-3160.*
A. Thess et al., Crystalline Ropes of Metallic Carbon Nanotubes, Science, 1996, vol. 273:483-487.
C. Journet et al., Large-Scale Production of Single-Walled Carbon Nanotubes by the Electric-Arc Technique, Nature, 1997, vol. 388:756-758.
P. Nikolaev et al., Gas-Phase Catalytic Growth of Single-Walled Carbon Nanotubes From Carbon Monoxide, Chem. Phys. Lett., 1999, vol. 313:91-97.
J. Kong et al., Chemical Vapor Deposition of Methane for Single-Walled Carbon Nanotubes, Chem. Phys. Lett., 1998, vol. 292:567-574.
J. Kong et al., Synthesis of Individual Single-Walled Carbon Nanotubes on Patterned Silicon Wafers, Nature, 1998, vol. 395:878-881.
A. Cassell et al., Large Scale CVD Synthesis of Single-Walled Carbon Nanotubes, J. Phys. Chem., 1999, vol. 103:6484-6492.
H. Dai et al., Controlled Chemical Routes to Nanotube Architectures, Physics, and Devices, J. Phys. Chem., 1999, vol. 103:11246-11255.

(Continued)

*Primary Examiner* — Patrick Ryan
*Assistant Examiner* — William Leader

(57) ABSTRACT

This invention relates to the electrochemical deposition of carbon nanotubes ("CNTs") on a substrate using an electrochemical cell. A dispersion of a complex of CNTs and an anionic polymer is neutralized and thereby caused to deposit on the anode plate of the cell.

10 Claims, 9 Drawing Sheets

OTHER PUBLICATIONS

Yan Li et al., Preparation of Monodispersed FE-MO Nanoparticles as the Catalyst for CVD Synthesis of Carbon Nanotubes, Chem. Mater., 2001, vol. 13:1008-1014.

N. Franklin et al., An Enhanced CVD Approach to Extensive Nanotube Networks with Directionality, Adv. Mater., 2000, vol. 12:890-894.

A. Cassell et al., Directed Growth of Free-Standing Single-Walled Carbon Nanotubes, J. Am. Chem. Soc., 1999, vol. 121:7975-7976.

Antsypovitch, Peptide Nucleic Acids: Structure, Properties, Applications, Strategies and Practice of Chemical Synthesis, Russian Chemical Reviews, 2002, vol. 71:71-83.

* cited by examiner

Figure 2. Image of a continuous CNT film deposited on a bare ITO substrate

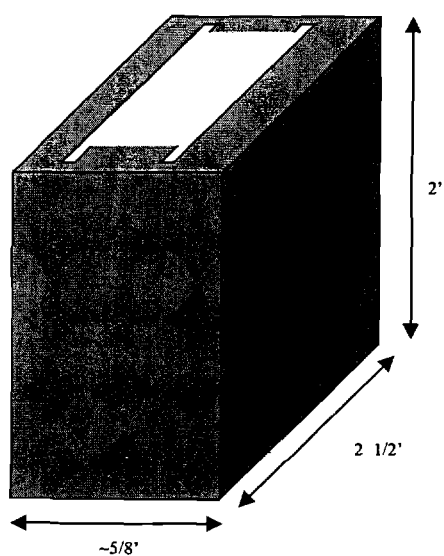
Figure 5. Geometry of the electrochemical cell used in the Examples

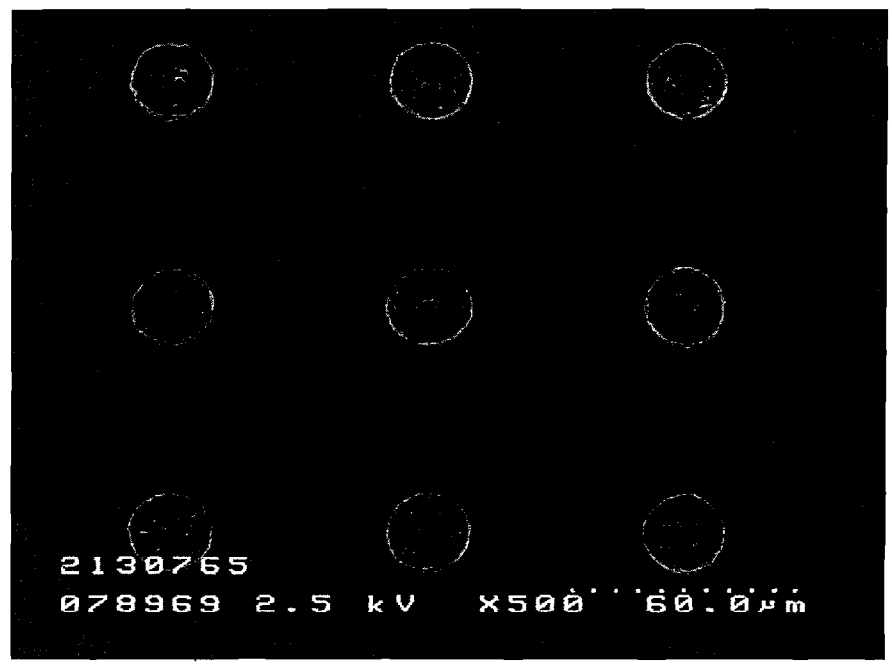
Figure 6. SEM image of CNT deposited on a PR patterned ITO substrate

Figure 7: An image of the phosphor illumination by the field emission electrons from a continuous CNT film as disclosed in Example 3.
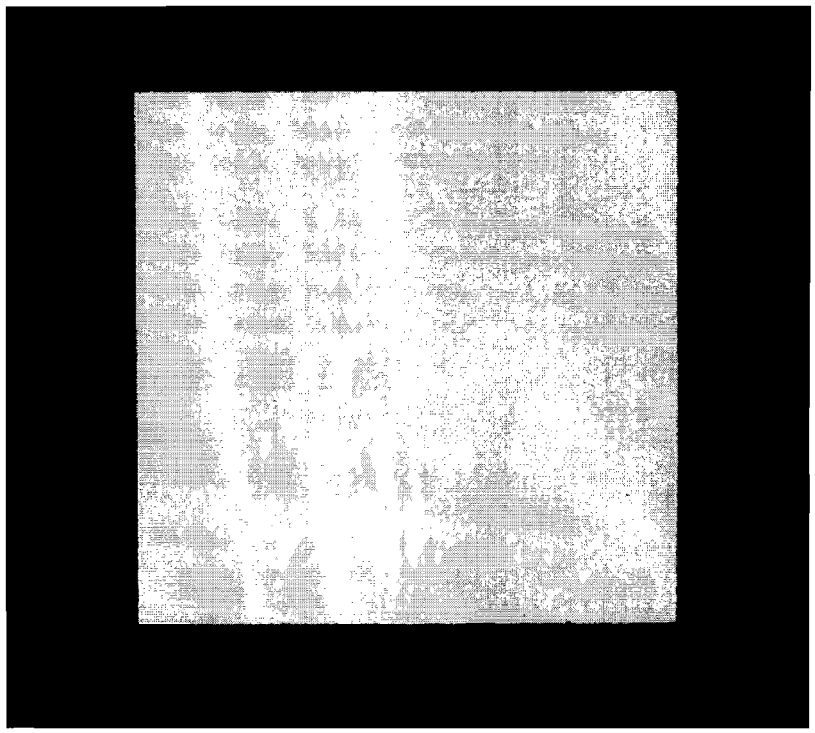

Figure 8: Anode current and anode voltage plot of a field emission device comprising arrays of CNT dots as disclosed in Example 4.
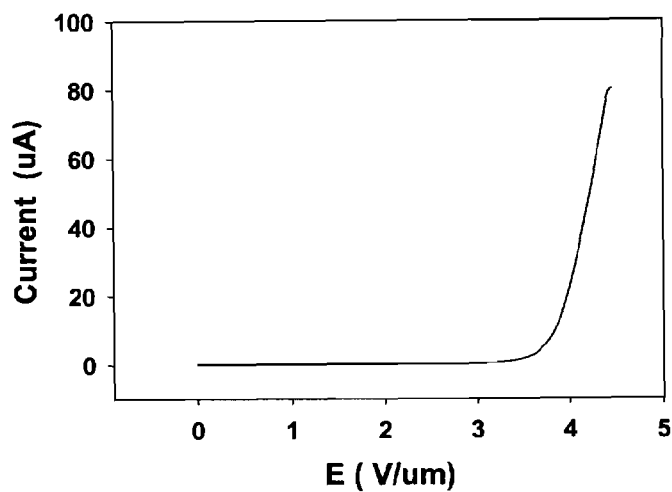

Figure 9: An image of the phosphor illumination by the field emission electrons from arrays of CNT dots as disclosed in Example 4.
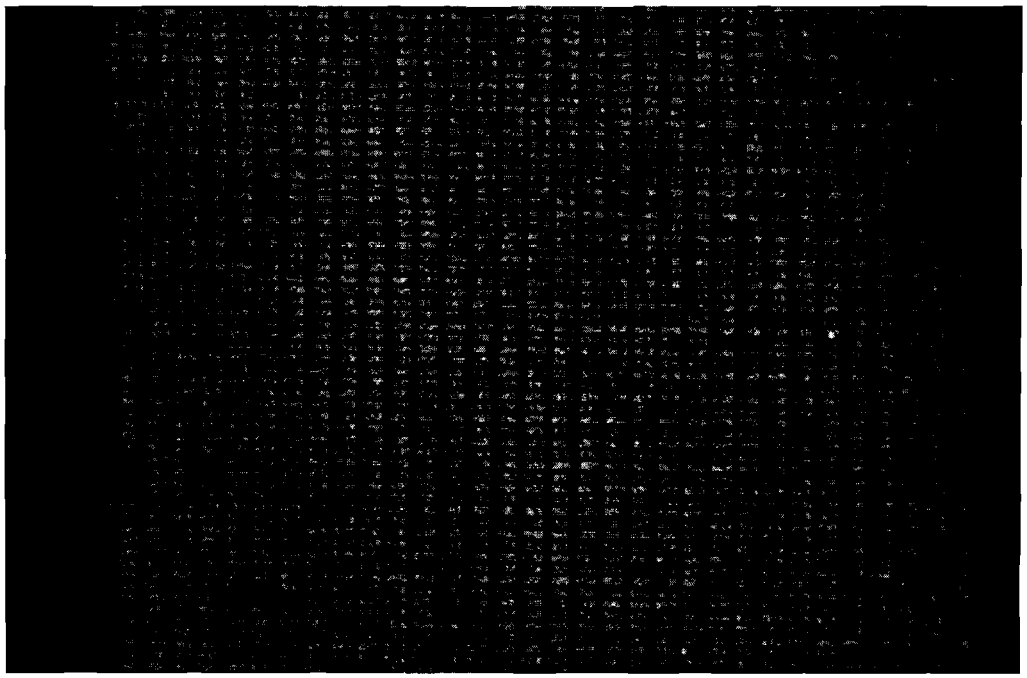

Figure 10: An image of the phosphor illumination by the field emission electrons from an array of CNT dots deposited on a top-gate triode substrate as disclosed in Example 5.
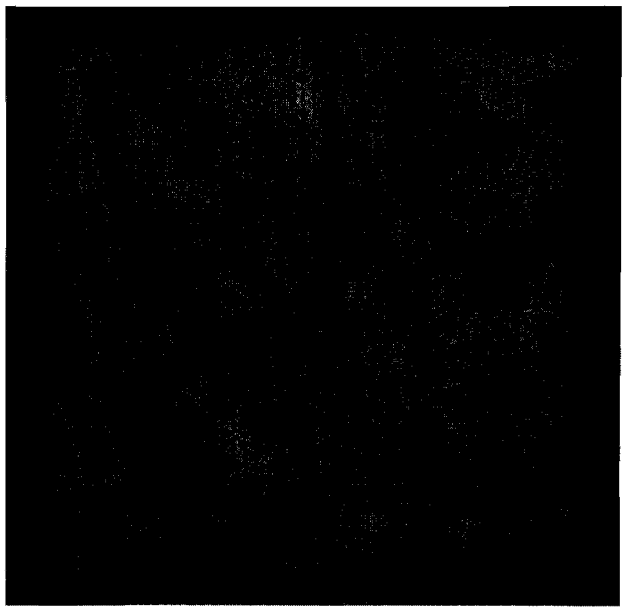

METHOD FOR THE ELECTROCHEMICAL DEPOSITION OF CARBON NANOTUBES

TECHNICAL FIELD

This invention relates to the electrochemical deposition of carbon nanotubes ("CNTs") on a substrate.

BACKGROUND

U.S. Pat. No. 6,902,658 describes an electrophoretic deposition method in which a separate step of depositing a binder material onto a substrate is performed prior to deposition thereon of CNTs. A need thus remains for a method in which CNTs and one or more accompanying materials may be deposited onto a substrate simultaneously.

SUMMARY

In one embodiment, this invention provides a method for the deposition of an acicular electron emitting material such as carbon nanotubes by:

(a) providing an electrochemical cell that comprises a cathode, an anode plate, a first electrically conducting pathway connecting the cathode to an electrical power supply, and a second electrically conducting pathway connecting the electrical power supply to the anode plate;

(b) providing as an aqueous electrolyte disposed between the cathode and the anode a dispersion that includes (i) a complex formed from carbon nanotubes and a first anionic polymer, and (ii) a binder material; and (c) applying a voltage to the electrochemical cell to deposit the complex on the anode.

In another embodiment, this invention provides a film that includes a substrate and, disposed on the substrate, (a) coagulant residue, (b) a complex formed from carbon nanotubes and a first anionic polymer, and (c) a binder material.

In a further embodiment, this invention provides a cathode assembly for a field emission device comprising a film as described above.

In yet another embodiment, this invention provides a field emission device comprising a cathode assembly as described above.

BRIEF DESCRIPTION OF THE DRAWINGS

FIG. 5 shows the configuration of an electrochemical cell as used in the examples.

FIG. 6 shows deposited material on a film as prepared in Example 2.

FIG. 7 shows an image of phosphor illumination from a film as tested in Example 3.

FIG. 8 shows a plot of recorded anode current and anode voltage values as obtained in Example 4.

FIG. 9 shows an image of phosphor illumination from a film as tested in Example 4.

FIG. 10 shows an image of phosphor illumination from a film as tested in Example 5.

DETAILED DESCRIPTION

Figure 1:
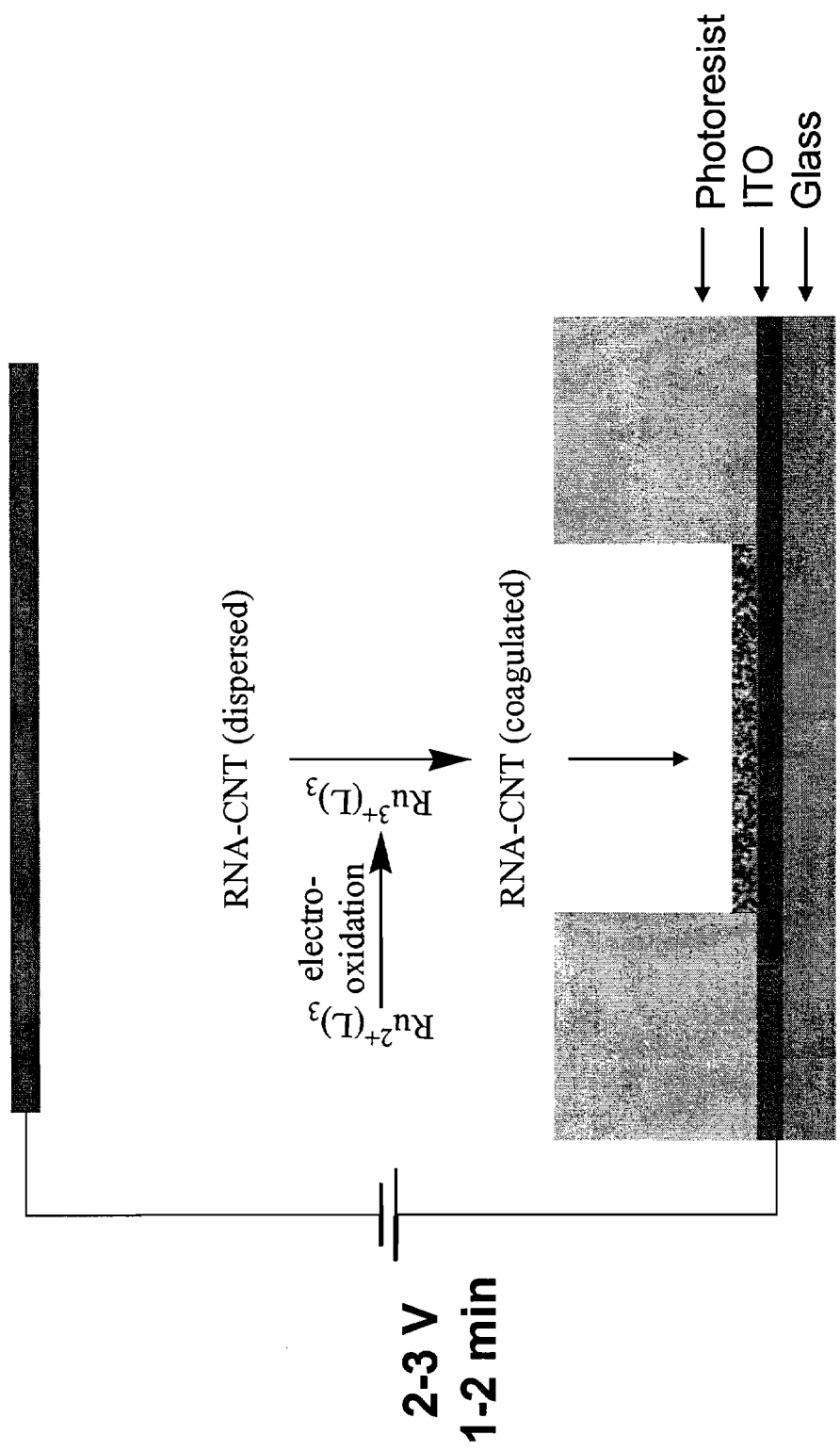
FIG. 1 shows a schematic representation of the mechanism of deposit in one embodiment of the methods of this invention.

CNTs are well known to have unique and useful electrical properties, and are frequently used in the fabrication of the cathode assembly of a field emission device. However, adoption of these materials is constrained by their high cost. Therefore, an objective of the invention is to provide a process for making a uniform CNT film on a substrate such as a conducting substrate with good uniformity and low material consumption. A further objective is to pattern the CNT film thus prepared to be useful in electronic applications. The CNT film so made may be used in a cathode assembly that is installed in a field emission device.

While CNTs are the preferred acicular electron emitting material for use in this invention, in alternative embodiments other carbon-containing field emitters may be used in the same manner as described herein for CNTs. Other carbon-containing field emitters include carbon fibers, and carbon fibers useful for such purpose include those that are grown from the catalytic decomposition of carbon-containing gases over small metal particles; polyacrylonitrile-based (PAN-based) carbon fibers; and pitch-based carbon fibers. As used herein, "acicular" means particles with aspect ratios of 10 or more.

In the methods of this invention, a CNT film is made by the deposition of CNTs on a substrate by electrochemical means, and for such purpose the methods hereof involve the use of an electrochemical cell. The cell contains a cathode, an anode plate, a first electrically conducting pathway connecting the cathode to an electrical power supply, and a second electrically conducting pathway connecting the electrical power supply to the anode plate. An aqueous electrolyte is provided to the cell and is disposed between the cathode and the anode. Contained in the electrolyte is a dispersion of a complex formed from CNTs and a first anionic polymer, and optionally a coagulant.

CNTs as used herein generally have a diameter that is in the range of about 0.5 to about 2 nm, and the ratio of the length dimension to the narrow dimension, i.e. the aspect ratio, of these CNTs is typically at least about 5. More specifically, the aspect ratio may be between about 10 and about 2000. CNTs are comprised primarily of carbon atoms, although they may be doped with other elements such as metals. CNTs as used in this invention can be either multi-walled nanotubes (MWNTs) or single-walled nanotubes (SWNTs). A MWNT, for example, includes several concentric nanotubes each having a different diameter. Thus, the smallest diameter tube is encapsulated by a larger diameter tube, which in turn, is encapsulated by another larger diameter nanotube. A SWNT, on the other hand, includes only one nanotube.

CNTs may be produced by a variety of methods, and are additionally commercially available. Methods of CNT synthesis include laser vaporization of graphite [A. Thess et al, Science 273, 483 (1996)], arc discharge [C. Journet et al, Nature 388, 756 (1997)] and HiPCo (high pressure carbon monoxide) process [P. Nikolaev et al, Chem. Phys. Lett. 313, 91-97 (1999)]. Chemical vapor deposition (CVD) can also be used in producing carbon nanotubes [J. Kong et al, Chem. Phys. Lett. 292, 567-574 (1998); J. Kong et al, Nature 395, 878-879 (1998); A. Cassell et al, J. Phys. Chem. 103, 6484-6492 (1999); and H. Dai et al, J. Phys. Chem. 103, 11246-11255 (1999)]. Additionally CNTs may be grown via catalytic processes both in solution and on solid substrates [Yan Li et al, Chem. Mater.; 2001; 13(3); 1008-1014); N. Franklin and H. Dai, Adv. Mater. 12, 890 (2000); A. Cassell et al, J. Am. Chem. Soc. 121, 7975-7976 (1999)].

A major obstacle to the use of CNTs has been the diversity of tube diameters, chiral angles, and aggregation states in nanotube samples obtained from the various preparation methods. Aggregation is particularly problematic because these highly polarizable, smooth-sided fullerene tubes readily form parallel bundles or ropes with a large van der Waals binding energy. This bundling perturbs the electronic structure of the tubes, and it confounds almost all attempts to separate the tubes by size or type or to use them as individual macromolecular species.

There is provided by this invention a method for dispersing a population of bundled carbon nanotubes by contacting the bundled nanotubes with an aqueous solution of an anionic polymer. A complex containing the anionic polymer and the CNTs is thereby formed, but the association between the anionic polymer and the CNTs in the complex is a loose association, is formed essentially by van der Waals forces or some other non-covalent means, and is not formed through the interaction of specific functionalized groups. The structural integrity of the CNTs is therefore retained, but the complexes they form with the anionic polymers become suspended in a dispersion in the electrolyte.

A variety of anionic polymers may be used as dispersants for the purpose of dispersing CNTs in an aqueous solution by facilitating the formation of the polymer/CNT complex. The methods of this invention therefore include the provision of a dispersion of bundled CNTs by contacting the nanotubes with a solution of one or more anionic polymers. Examples of some of the anionic polymers that have been found suitable in the preparation of a dispersion of CNTs include without limitation ionized poly(acrylic acid) ("PAA") or ionized ethylene/(meth)acrylic acid copolymer ("EAA" or "EMAA"), either of which may be neutralized with cations such as $Na^+$, $K^+$, $NH_4^+$, or $Cr^+$; styrenic ionomers such as styrene/sodium styrene sulfonate copolymer (PSS) or styrene/sodium styrene methacrylate copolymer; and ionized tetrafluoroethylene/sulfonic acid copolymers such as Nafion™ copolymer (from DuPont) in which the sulfonic acid group in a tetrafluoroethylene/perfluorovinyl ether copolymer may be sodium neutralized. Ultrasonication or other mixing means may be applied to facilitate the dispersion of CNTs in an aqueous solution of one or more of the anionic polymers discussed above.

Although a variety of anionic polymers may be used as dispersants for the purpose of dispersing CNTs in an aqueous solution by facilitating the formation of the polymer/CNT complex, a preferred type of polymer for use for such purpose is a nucleic acid, particularly a stabilized solution of nucleic acid molecules. Nucleic acids are very effective in forming a dispersion of CNTs as a result of their tendency to form nanotube-nucleic acid complexes based on non-covalent interactions between the nanotube and the nucleic acid molecule. In the following discussion of the use of nucleic acid molecules to form complexes with and thereby disperse CNTS, the following defined terms and abbreviations are used:

"CDNA" means complementary DNA
"PNA" means peptide nucleic acid
"SEM" means scanning electron microscopy
"ssDNA" means single stranded DNA
"tRNA" means transfer RNA
"CNT" means carbon nanotube
"MWNT" means multi-walled nanotube
"SWNT" means single walled nanotube
"TEM" means transmission electron microscopy.

A "nucleic acid molecule" is defined as a polymer of RNA, DNA, or peptide nucleic acid (PNA) that is single- or double-stranded, optionally containing synthetic, non-natural or altered nucleotide bases. A nucleic acid molecule in the form of a polymer of DNA may be comprised of one or more segments of cDNA, genomic DNA or synthetic DNA.

The letters "A", "G", "T", "C" when referred to in the context of nucleic acids are defined as the purine bases adenine ($C_5H_5N_5$) and guanine ($C_5H_5N_5O$) and the pyrimidine bases thymine ($C_5H_6N_2O_2$) and cytosine ($C_4H_5N_3O$), respectively.

The term "peptide nucleic acids" refers to a material having stretches of nucleic acid polymers linked together by peptide linkers.

A "stabilized solution of nucleic acid molecules" refers to a solution of nucleic acid molecules that are solubilized and in a relaxed secondary conformation.

A "nanotube-nucleic acid complex" is defined as a composition comprising a carbon nanotube loosely associated with at least one nucleic acid molecule. Typically the association between the nucleic acid and the nanotube is by van der Waals forces or some other non-covalent means.

The term "agitation means" refers to a devices that facilitate the dispersion of nanotubes and nucleic acids. A typical agitation means is sonication.

The term "denaturant" refers to substances effective in the denaturation of DNA and other nucleic acid molecules.

The use nucleic acids to form a dispersion of CNTs is described herein in the context of standard recombinant DNA and molecular biology techniques that are known in the art and are further discussed by Sambrook, Fritsch and Maniatis, *Molecular Cloning: A Laboratory Manual*, Second Edition, Cold Spring Harbor Laboratory Press, Cold Spring Harbor, N.Y. (1989) (hereinafter "Sambrook"); by Silhavy, Bennan and Enquist, *Experiments with Gene Fusions*, Cold Spring Harbor Laboratory Cold Press Spring Harbor, N.Y. (1984); and by Ausubel et al, *Current Protocols in Molecular Biology*, published by Greene Publishing Assoc. and Wiley-Interscience (1987).

Nucleic acid molecules as used herein in the formation of a dispersion may be of any type and from any suitable source and include but are not limited to DNA, RNA and peptide nucleic acids. The nucleic acid molecules used herein may be generated by synthetic means or may be isolated from nature by protocols well known in the art (Sambrook supra). The nucleic acid molecules may be either single stranded or double stranded and may optionally be functionalized at any point with a variety of reactive groups, ligands or agents. Functionalization of nucleic acids is not, however, required for their association with CNTs for the purpose of dispersion, and most of the nucleic acids used herein for dispersion do not contain functional groups and are therefore referred to herein as "unfunctionalized".

Peptide nucleic acids (PNA) are particularly useful herein for dispersion as they possess the double functionality of both nucleic acids and peptides. Methods for the synthesis and use of PNAs are well known in the art, see for example Antsypovitch, *Peptide nucleic acids: Structure, Russian Chemical Reviews* (2002), 71(1), 71-83.

The nucleic acid molecules used herein may have any composition of bases and may even consist of stretches of the same base (poly A or poly T, for example) without impairing the ability of the nucleic acid molecule to disperse the bundled CNTS. Preferably the nucleic acid molecules will be less than about 2000 bases where less than 1000 bases is preferred, and where from about 5 bases to about 1000 bases is most preferred. Generally the ability of nucleic acids to disperse CNTs appears to be independent of sequence or base composition, however there is some evidence to suggest that the less G-C and T-A base-pairing interactions in a sequence, the higher the dispersion efficiency; and that RNA and varieties thereof is particularly effective in dispersion and is thus preferred herein. Nucleic acid molecules suitable for use herein include without limitation those having the general formulae:

1. An wherein n=1-2000;
2. Tn wherein n=1-2000;
3. Cn wherein n=1-2000;
4. Gn wherein n=1-2000;
5. Rn wherein n=1-2000, and wherein R may be either A or G;
6. Yn wherein n=1-2000, and wherein Y may be either C or T;
7. Mn wherein n=1-2000, and wherein M may be either A or C;
8. Kn wherein n=1-2000, and wherein K may be either G or T;
9. Sn wherein n=1-2000, and wherein S may be either C or G;
10. Wn wherein n=1-2000, and wherein W may be either A or T;
11. Hn wherein n=1-2000, and wherein H may be either A or C or T;
12. Bn wherein n=1-2000, and wherein B may be either C or G or T;
13. Vn wherein n=1-2000, and wherein V may be either A or C or G;
14. Dn wherein n=1-2000, and wherein D may be either A or G or T; and
15. Nn wherein n=1-2000, and wherein N may be either A or C or T or G.

In addition to the combinations listed above, any of these sequences may have one or more deoxyribonucleotides replaced by ribonucleotides (i.e. RNA or RNA/DNA hybrid) or one or more sugar-phosphate linkages replaced by peptide bonds (i.e. PNA or PNA/RNA/DNA hybrid).

Nucleic acid molecules as used herein may be stabilized in a suitable solution. It is preferred that the nucleic acid molecules be in a relaxed secondary conformation and only loosely associated with each other to allow for the greatest contact by individual strands with the CNTs. Stabilized solutions of nucleic acids are common and well known in the art (see Sambrook, supra), and typically include salts and buffers such as sodium and potassium salts, and TRIS [Tris(2-aminoethyl)amine], HEPES [N-(2-hydroxyethyl)piperazine-N'-(2-ethanesulfonic acid)], and MES [2-(N-Morpholino) ethanesulfonic acid]. Preferred solvents for stabilized nucleic acid solutions are those that are water miscible, where water itself is most preferred. The process of dispersion may be improved with the optional addition of nucleic acid denaturing substances to the solution. Common denaturants include but are not limited to formamide, urea and guanidine. A non-limiting list of suitable denaturants may be found in Sambrook, supra.

To prepare a dispersion of CNTs according to a method hereof, one or more nucleic acid molecules may be contacted with a population of bundled carbon nanotubes. It is preferred, although not required, contact be made in the presence of an agitation means of some sort. Typically the agitation means employs sonication, but may also include devices that produce high shear mixing of the nucleic acids and CNTs (i.e. homogenization), or any combination thereof. Upon agitation, the CNTs will become dispersed and will form nanotube-nucleic acid complexes comprising at least one nucleic acid molecule loosely associated with the CNT by hydrogen bonding or some other non-covalent means.

Temperature during the process of contacting CNTs with a nucleic acid may have an effect on the efficacy of the dispersion. Mixing at room temperature or higher has been seen to give longer dispersion times whereas mixing at temperatures below room temperature (~23° C.) has been seen to give more rapid dispersion times, and temperatures of about 0° C. to about 10° C. are preferred. The dispersion of CNTs by contact with nucleic acid molecules is also described in US 2004/0132072 and US 2004/0146904, each of which is by this reference incorporated in its entirety as a part hereof for all purposes.

In one embodiment, deposition on the anode plate of the cell of the complexes formed from CNTs and molecules of an anionic polymer, as dispersed in the electrolyte solution contained in the cell, will be facilitated by the presence therein of the optional coagulant. The coagulant will neutralize the negative charge on the anionic polymer in the complex. As the population of anionic polymer/CNT complexes has been maintained in dispersion primarily by the repulsion of one negatively charged complex from another (or by the repulsion of positively charged double layers surrounding the complexes), neutralization of those negative charges (or compression of the double layer) by the coagulant will remove the force enabling the population of complexes to remain in dispersion in the electrolyte solution. As the action of the coagulant to neutralize the complexes occurs in close proximity to the anode plate, the complexes (as no longer dispersed) will in varying degrees undergo a transition from solution phase to solid phase, become progressively aggregated and agglomerated (similar to the formation of follicles and flocs), and then be collected and deposited on the surface of the anode plate. In addition to the CNT complexes, the material as deposited on the plate may include coagulant residue.

Coagulants suitable for use herein for the purpose of neutralizing an anionic polymer/CNT complex include inorganic coagulants such as trivalent cations formed from metals including Group VIII/VIIIA metals such as iron, cobalt, ruthenium or osmium. As a trivalent cation can be up to as much as ten times more effective in neutralizing the complex than a divalent cation, a convenient way to provide the coagulant is to supply a divalent cation such as tris(2,2'-bipyridyl) dichloro-ruthenium (II) to the electrolyte solution wherein the $2^+$ cation is oxidized to a $3^+$ valence by the loss of electrons to the anode plate. A schematic representative of this mechanism is shown in FIG. 1.

In an alternative embodiment, however, a coagulant is not used where the anode plate is formed from a metal such as silver or nickel. In such case, the metal on the plate dissolves in the electrolyte solution, and the charge on an anionic polymer/CNT complex is neutralized by cations formed from metal atoms that have gone into solution from the solid metal from which the plate if formed.

Figure 2:
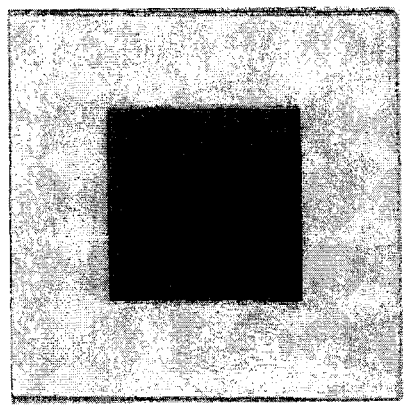
FIG. 2 shows deposited material on a film as prepared in Example 1.

If first and second anionic polymers are present in the electrolyte solution, such as a first polymer that forms a complex with CNTs, and a second polymer that does not form such complex or is more loosely associated with CNTs than the first polymer, they may become deposited on the surface of the anode at the same time. The first polymer may, for example, be deposited in a matrix of the second polymer. If additional materials needed to enhance the usefulness and performance of the anode plate in a field emission device, such as conductive or functionalized particles, are present in the electrolyte solution, they may be deposited on the anode plate at the same time as the anionic polymer/CNT complexes. FIG. 2 shows a typical example of the type of film formed by such deposition on the anode plate, which film has good uniformity of evenly deposited, well-adhered material all across its surface.

Figure 3:
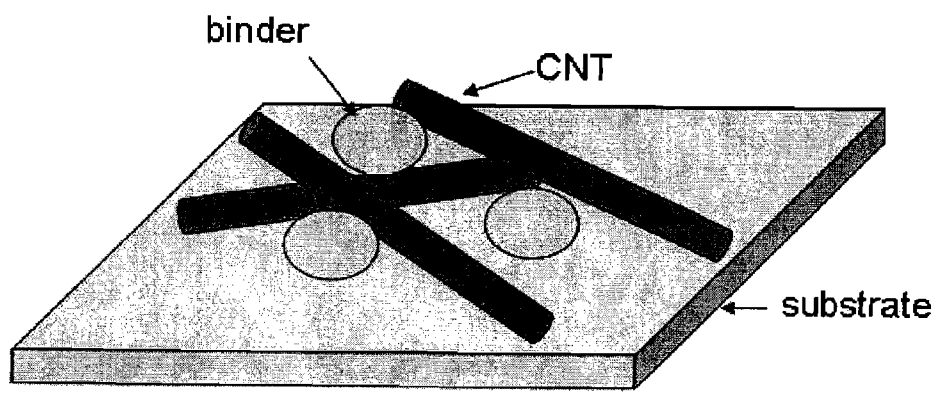
FIG. 3 shows an arrangement of CNTs and binder material as deposited on a substrate.

In one particular embodiment, a binder material may be present in the electrolyte solution so that it will become deposited on the anode plate along with the CNT complex [and with optional other anionic polymer(s), if present]. As the cell anode plate will be incorporated into the cathode assembly of a field emission device, it is useful to have a binder material co-deposited on the anode plate along with the CNT complexes to (i) enhance binding of the CNTs in the complexes to the substrate, (ii) to shield electrostatic repulsion between the CNTs, and (iii) to fill voids between the CNT rods. This type of function of a binder material to enhance the adhesion and stability of the CNT film made by the electro-deposition methods of this invention is illustrated in FIG. 3.

Figure 4:
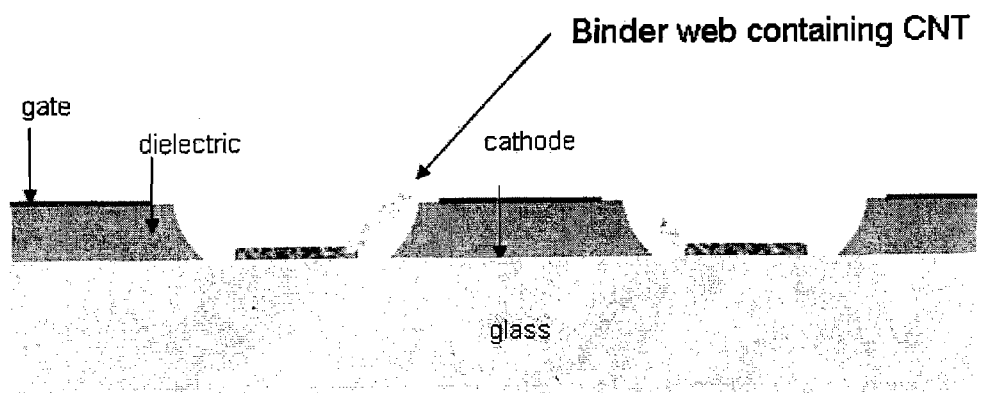
FIG. 4 shows the unintended deposit of a mixture of CNTs and binder material outside of the well in the cathode assembly of a triode.

In the selection of the binder material, however, there are certain polymers that bind so tenaciously to the substrate that once the binder material becomes deposited in an unintended location, removal is very difficult. When, for example, the CNT complex material is to be deposited on a plate patterned as a triode, as described below, the presence of deposited binder outside of the CNT well may cause shorting between the cathode and the gate electrode, as illustrated in FIG. 4. The preferred choice of binder material is thus a material that has a relatively high solubility in water, has a relatively small size (e.g. a few nm), and does not bind so tenaciously that it cannot be removed with relative ease such as by peeling off an adhesive layer that has been applied to the surface of the CNT film produced on the anode plate.

Examples of such a preferred type of binder material suitable for use herein include an albumin material, which is defined herein as any protein that is soluble in water, is moderately soluble in concentrated salt solutions, and experiences heat coagulation (i.e. protein denaturation). Substances that contain an albumin material, such as egg white, are called albuminoids. The most well-known type of albumin material is the serum albumin in blood. Bovine serum albumin (cattle serum albumin or "BSA") is known from its conventional use in medical and molecular biology labs. Other types of albumin materials include the storage protein ovalbumin in egg white, and storage albumins in the seeds of plants such as soy.

The method hereof may be used to produce a film in which the deposited material is deposited in a pre-determined pattern. This may be accomplished by patterning the surface of the plate used as the anode using conventional photoimaging techniques. Thus a photoresist may be activated through a mask and then developed to provide on the surface of the anode a pattern such as an array of circular wells. As the anionic polymer/CNT complexes are aggregated and settle out of solution, they are deposited only in the circular wells, and the photoresist may then be removed. This provides a patterned CNT film, with the anode plate serving as a substrate for the film, for use by installation in a field emission device ("FED").

The method hereof is generally performed by operation of the cell at lower potential such as less than about 5 volts, or from about 2 to less than about 5 volts, or from about 2 volts to about 3 volts. Thickness of the deposited film is to a large extent directly related to length of deposition time. A deposition time in the range of about 1 to about 10 minutes, or in the range of about 1 to about 2 minutes, may be used. A positive potential is maintained at the anode plate relative to the cathode of the cell.

After completion of the deposition of the CNT complex material on the anode plate in the cell, the plate may be removed from the cell, rinsed, dried and installed in such condition in a FED for use as part of the cathode assembly therein to provide electron emission. Alternatively, however, the plate may be baked and/or fired before installation in a field emission device to melt the deposited polymer(s) and utilize them in that form as an adhesive to more securely anchor the CNTs to the surface of the plate, resulting in a CNT-containing film with excellent abrasion resistance. Firing may be performed at a temperature in the range of about 250° C. to about 650° C., or about 350° C. to about 550° C., or about 450° C. to about 525° C., for a period of time in the range of about 5 to about 30 minutes, or about 10 to about 25 minutes, or about 10 to about 20 minutes.

After completion of the deposition of the CNT complex material on the anode plate in the cell, the cell anode plate may be installed in an FED for use as part of the FED cathode assembly to provide electron emission. The CNTs, when energized, bombard the FED anode with electrons. The FED anode is an electrode coated with an electrically conductive layer. When the FED is used in a display device wherein the cathode assembly contains an array of pixels of the CNT deposits described above, the FED anode may be provided with phosphors to convert incident electrons into light. The substrate of the FED anode would also be selected to be transparent so that the resulting light could be transmitted. From the FED cathode assembly and the FED anode, a sealed unit is constructed in which the cathode assembly and anode are separated by spacers, and there is an evacuated space between them. This evacuated space is under partial vacuum so that the electrons emitted from the FED cathode may transit to the FED anode with only a small number of collisions with gas molecules. Frequently the evacuated space is evacuated to a pressure of less than $10^{-5}$ Torr.

An FED is useful in a variety of electronic applications, e.g. in a vacuum electronic devices, in a flat panel display such as computer or television display, a back-light source for an LCD display, an emission gate amplifier, a klystron and in a lighting device. For example, a flat panel display having a cathode that employs an electron emitting material as a field emitter, and a phosphor capable of emitting light upon bombardment by electrons emitted by the field emitter has been proposed. Such a display has the potential for providing the visual display advantages of the conventional cathode ray tube and the depth, weight and power consumption advantages of the other flat panel displays, which can be planar or curved. U.S. Pat. Nos. 4,857,799 and 5,015,912 disclose similar matrix-addressed flat panel displays using micro-tip cathodes constructed of tungsten, molybdenum or silicon; and WO 94-15352, WO 94-15350 and WO 94-28571 disclose flat panel displays wherein the cathodes have relatively flat emission surfaces. These devices are also described in US 2002/0074932, which is by this reference incorporated in its entirety as a part hereof for all purposes.

As the plate that is used the anode in the electrolytic cell will ultimately be used in the cathode assembly of a FED, the plate can be a substrate formed from any material to which the CNT complex material will adhere. Silicon, a glass, a metal or a refractory material such as alumina can serve as the substrate. For FED applications, the preferable substrate is glass, and soda lime glass is especially preferred. It is desirable that the plate used as the anode in the cell already be provided with conductive means onto which the CNTs may be deposited. One example of a suitable plate to use for such purpose is a glass plate, such as a soda lime glass plate, that is coated with a conductive material such as indium tin oxide ("ITO").

Alternatively, however, the plate used for such purpose could be a substrate on which conductive materials have first been deposited by thick film paste methods.

A plate suitable for use as the cell anode may alternatively be a substrate on which one or more layers of conductive or non-conductive materials have first been deposited by thick film paste methods. Various screen printing processes can be used to attach conductor lines, a dielectric layer or a gate layer to a substrate. The means of attachment must withstand and maintain its integrity under the conditions of manufacturing the apparatus into which the FED cathode assembly is placed and under the conditions surrounding its use, e.g. typically vacuum conditions and temperatures up to about 450° C. A preferred method is to screen print a paste containing the material from which the layer is to be formed onto a substrate in the desired pattern, where the material may be selected for example from: glass frit, metallic powder, metallic paint (such as silver or gold), a dielectric material or a mixture thereof; and to then fire the dried patterned paste. For a wider variety of applications, e.g. those requiring finer resolution, the preferred process may include screen printing a paste that also contains a photoinitiator and/or a photohardenable monomer, and then photopatterning the dried paste and firing the patterned paste.

The substrate can be any material to which the paste composition will adhere. Silicon, a glass, a metal or a refractory material such as alumina can serve as the substrate. For FED applications, the preferable substrate is glass, and soda lime glass is especially preferred. The paste used for screen printing a cathode conductor or gate layer typically contains an organic medium, solvent, surfactant and either low softening point glass frit, metallic powder or metallic paint or a mixture thereof. Examples of suitable dielectric materials include porcelain (ceramic), mica, glass, plastics such as epoxy, polycarbonate, polyimide, polystyrene and poly(tetrafluoroethylene), and the oxides and nitrides of various metals such as aluminum, silicon, tin and titanium. The role of the medium and solvent is to suspend and disperse the particulate constituents, i.e. the solids, in the paste with a proper rheology for typical patterning processes such as screen printing. There are many organic media known for use for such purpose including cellulosic resins such as ethyl cellulose and alkyd resins of various molecular weights. Butyl carbitol, butyl carbitol acetate, dibutyl carbitol, dibutyl phthalate and terpineol are examples of useful solvents. These and other solvents are formulated to obtain the desired viscosity and volatility requirements.

A glass frit that softens sufficiently at the firing temperature to adhere to the substrate and to the deposited solids is also used. A lead or bismuth glass frit can be used as well as other glasses with low softening points such as calcium or zinc borosilicates. The paste typically contains about 40 wt % to about 80 wt % solids based on the total weight of the paste. These solids include the dielectric material, glass frit and/or conductive components. Variations in the composition can be used to adjust the viscosity and the final thickness of the printed material. For example, a paste prepared from silver and glass frit will typically contain about 40-75 wt % silver in the form of fine silver particles and about 3-15 wt % glass frit based on the total weight of the paste.

If the screen-printed paste is to be photopatterned, the paste may also contain a photoinitiator, a developable binder and a photohardenable monomer comprised, for example, of at least one addition polymerizable ethylenically unsaturated compound having at least one polymerizable ethylenic group.

The paste is typically prepared by three-roll milling a mixture of the organic medium, surfactant, solvent and either low softening point glass frit, metallic powder or metallic paint or a mixture thereof. The paste mixture can be screen printed using, for example, a 165-400-mesh stainless steel screen. The paste can be deposited as a continuous film or in the form of a desired pattern.

After printing, the plate is further prepared by removing any residual photoresist material, drying the plate, and then installing it as the anode plate in the electrochemical cell. Alternatively, however, and preferably, the plate may be baked and/or fired before installation in the electrochemical cell to melt the deposited frits and utilize them in that form as an adhesive to more securely anchor the metals or other conductive materials to the surface of the plate, resulting in a plate with excellent abrasion resistance. Firing may be performed at a temperature in the range of about 250° C. to about 650° C., or about 350° C. to about 550° C., or about 450° C. to about 525° C., for a period of time in the range of about 5 to about 30 minutes, or about 10 to about 25 minutes, or about 10 to about 20 minutes. The organic constituents in the paste are effectively volatilized at 350-450° C., leaving a layer of the composite of the inorganic materials, conductive materials and/or non-conductive materials.

Materials as used in the process hereof may be made by processes known in the art, or are available commercially from suppliers such as Alfa Aesar (Ward Hill, Mass.), City Chemical (West Haven, Conn.), Fisher Scientific (Fairlawn, N.J.), Sigma-Aldrich (St. Louis, Mo.) or Stanford Materials (Aliso Viejo, Calif.).

The advantageous attributes and effects of this invention may be seen in a series of examples (Examples 1 ~5), as described below. The embodiments on which the examples are based are representative only, and the selection of those embodiments to illustrate the invention does not indicate that materials, conditions, specifications, components, reactants, techniques and protocols not described in these examples are not suitable for practicing this invention, or that subject matter not described in these examples is excluded from the scope of the appended claims and equivalents thereof.

EXAMPLES 150 mg of laser-ablated CNTs (from CNI, Houston, Tex.) was mixed with 30 mg yeast RNA (from Sigma Aldrich) in 15 mL of 1×TBE [tris borate (ethylenediamine tetraacetic acid)] buffer (from Sigma Aldrich). The mixture was sonicated with a probe sonicator at a power level of 20 W for 30 min. The resulting dispersion ("CNT Dispersion") was mixed with deionized water and two other components according to the following table (Table 1) to make up 100 mL of a deposition solution ("Deposition Solution") to be used as the electrolyte in a cell. $Ru^{2+}(bipy)_3$ as used in the Deposition Solution is tris(2,2'-bipyridyl)dichloro-ruthenium (II) and is obtained from Sigma Aldrich.

Bovine serum albumin was obtained from Sigma Aldrich.

TABLE 1

Composition of deposition solution

| Component | Stock conc. | Volume added | Final conc. |
|---|---|---|---|
| CNT Dispersion | 10 mg/mL | 4 mL | 0.04% |
| Bovine serum albumin | 10 mg/mL | 1 mL | 0.01% |
| $Ru^{2+}(bipy)_3$ | 10 mM | 2 mL | 0.2 mM |
| water | | 92 mL | |

Example 1

Deposition of a Continuous CNT Film on ITO Substrate

A 2'×2' stainless steel plate (as the cell cathode) and a 2'×2' ITO plate (as the cell anode) were inserted in a parallel fashion into a rectangular electrochemical cell (the configuration of which is shown in FIG. 5) containing 15 mL of the Deposition Solution. A potential difference of 3.2 V was applied between the two electrodes. After 1 minute, the deposition was stopped, and the ITO plate was taken out of the cell, rinsed with deionized water and dried in air. The type of deposition obtained on the ITO plate is represented by the illustration in FIG. 2.

Example 2

Deposition of an Array of CNT Dots on ITO Substrate

In this case, a photoresist (PR) patterned indium tin oxide (ITO) substrate (2'×2') was used as the cell anode plate. The PR layer defines an array of open holes with 20 um diameter. The open holes expose the ITO surface for CNT deposition. Before electrodeposition, the PR coated ITO plate was dipped into a solution of 0.01% Triton X-100, taken out and dried by blowing $N_2$ gas, which coats the hydrophobic PR layer with a thin hydrophilic layer for better wetting. After this treatment, a 2'×2' stainless steel plate (as the cell cathode) and the PR-coated ITO plate (as the cell anode) were inserted in a parallel fashion into a rectangular electrochemical cell containing 15 mL of the Deposition Solution. An AC potential (100 Hz square wave with 0 to 3.5 V peak-to-peak voltage and 50% duty cycle) was applied between the two electrodes. After 1 minute, the deposition was stopped, and the ITO plate was taken out of the cell, rinsed with deionized water and dried in air. The PR layer was stripped off with an organic solvent (acetone). The type of deposition obtained on the ITO plate is represented by the illustration in FIG. 6.

Example 3

Electron Field Emission from the CNT Film of Example 1

The dried sample obtained from Example 1 and represented by the illustration in FIG. 2 was fired in nitrogen for 10 minutes at 420° C. A piece of adhesive tape was then laminated over the CNT film and removed. This process, commonly referred to as "activation", is known to fracture the film surface exposing and lifting the CNT filaments off the substrate surface to dramatically enhance electron field emission. A diode field emission device ("FED") was then assembled by using the CNT film coated ITO substrate as a cathode.

Opposite to this "activated" cathode, an FED anode plate consisting of an ITO coated glass substrate with a phosphor coating was mounted. Electrically insulating spacers 1 mm thick were used to maintain a distance between the FED cathode and anode substrates.

Electrical contact was made to the cathode and anode electrodes using silver paint and copper tape to complete the diode device. The device was mounted in a vacuum chamber which was evacuated to a pressure of $<1\times10^{-5}$ Torr. A pulsed square wave with a repetition rate of 60 Hz and a pulse width of 60 μs was applied to the anode electrode. The cathode electrode was maintained at ground potential. At an anode voltage of 2 kV, an anode current of 200 μA was obtained. An image of the phosphor illumination by electrons emitted by this device is shown in FIG. 7.

Example 4

Electron Field Emission from the Array of CNT Dots of Example 2

The dried sample obtained from Example 2 and represented by the illustration in FIG. 6 was fired in nitrogen for 10 minutes at 420° C. The CNT dot surfaces were activated with a piece of adhesive tape. A diode field emission device was then assembled by using the CNT dot covered ITO substrate as an FED cathode and an ITO coated glass substrate with a phosphor coating as an FED anode. Glass spacers 0.22 mm thick were used in this example to maintain a distance between the cathode and anode substrates. The device was mounted in a vacuum chamber which was evacuated to a pressure of $<1\times10^{-5}$ Torr. A pulsed square wave with a repetition rate of 60 Hz and a pulse width of 60 μs was applied to the anode electrode. The cathode electrode was maintained at ground potential. When the pulsed anode voltage reached 800 V, an average anode current of 5 μA was measured. As the pulse anode voltage was increased, increasing anode current was measured. At an anode voltage of 925 V, an anode current of 40 μA was obtained. FIG. 8 shows a plot of the recorded anode current and anode voltage values from the field emission device operated in this example. An image of phosphor illumination by electrons emitted by this device, operating at 975 V anode voltage and 80 μA anode current, is shown in FIG. 9. Each rectangular illuminated pixel on the anode was produced by an array of multiple CNT dots on the cathode.

Example 5

Electron Field Emission from a Triode Device

In this example, CNT dots were deposited on a top-gate triode substrate instead of on a plain ITO coated glass substrate as in Example 4. A top-gate triode substrate typically contains two conductive layers sandwiching an insulating layer. In this example, the top-gate triode substrate was prepared on an ITO coated glass substrate using the ITO layer as the cathode. An insulating dielectric layer was then deposited on top of the ITO. A metallic gate electrode layer was then deposited on the dielectric layer. In addition, an array of holes was fabricated through the metal and dielectric layers exposing the ITO surface. As in Example 2, photopatterning was used to define an array of holes on a PR layer covering the triode substrate. The PR hole diameter was smaller than, and the circumference concentric with that of, the holes on the metal and dielectric layers.

Using procedures similar to those described in Examples 2 and 4, CNT dots were deposited on the ITO surface, fired and activated. An FED was prepared by mounting, opposite the activated triode cathode, an anode plate consisting of an ITO coated glass substrate with a phosphor coating. Spacers 3 mm thick were used to maintain the distance between the cathode and anode substrates. Electrical contact was made to the ITO cathode electrode, metal gate electrode, and ITO anode electrode using silver paint and copper tape to complete a top-gate triode device. The device was mounted in a vacuum chamber which was evacuated to a pressure of $<1\times10^{-5}$ Torr. A DC voltage of 3 kV was applied to the anode electrode. A pulsed square wave with a repetition rate of 120 Hz and a pulse width of 30 μs was applied to the gate electrode. The cathode electrode was maintained at ground potential. When the pulsed gate voltage reached 70 V, an average anode current density of 5.0 μA/cm² was measured. An image of phosphor illumination by electrons emitted by this triode device is shown in FIG. 10.

Features of certain of the devices of this invention are described herein in the context of one or more specific embodiments that combine various such features together. The scope of the invention is not, however, limited by the description of only certain features within any specific embodiment, and the invention also includes (1) a subcombination of fewer than all of the features of any described embodiment, which subcombination may be characterized by the absence of the features omitted to form the subcombination; (2) each of the features, individually, included within the combination of any described embodiment; and (3) other combinations of features formed by grouping only selected features of two or more described embodiments, optionally together with other features as disclosed elsewhere herein.

In this specification, unless explicitly stated otherwise or indicated to the contrary by the context of usage, where an embodiment of the subject matter hereof is stated or described as comprising, including, containing, having, being composed of or being constituted by or of certain features or elements, one or more features or elements in addition to those explicitly stated or described may be present in the embodiment. An alternative embodiment of the subject matter hereof, however, may be stated or described as consisting essentially of certain features or elements, in which embodiment features or elements that would materially alter the principle of operation or the distinguishing characteristics of the embodiment are not present therein. A further alternative embodiment of the subject matter hereof may be stated or described as consisting of certain features or elements, in which embodiment, or in insubstantial variations thereof, only the features or elements specifically stated or described are present.

What is claimed is:

1. A method for the deposition of carbon nanotubes, comprising:
   (a) providing an electrochemical cell that comprises a cathode, an anode plate, a first electrically conducting pathway connecting the cathode to an electrical power supply, and a second electrically conducting pathway connecting the electrical power supply to the anode plate;
   (b) providing as an aqueous electrolyte disposed between the cathode and the anode a dispersion comprising (i) a complex formed from carbon nanotubes and a first anionic polymer, and (ii) a binder material comprises an albumin material; and
   (c) applying a voltage to the electrochemical cell to deposit the complex on the anode.

2. A method according to claim 1 wherein the aqueous electrolyte further comprises a coagulant.

3. A method according to claim 2 wherein coagulant residue is deposited on the anode together with the complex.

4. A method according to claim 1 wherein the first polymer comprises a nucleic acid molecule.

5. A method according to claim 1 wherein the first polymer comprises RNA.

6. A method according to claim 1 wherein the electrolyte further comprises a second anionic polymer.

7. A method according to claim 6 wherein the second anionic polymer comprises a styrenic ionomer or an ionized ethylene/(meth)acrylic acid copolymer.

8. A method according to claim 6 wherein the complex, as deposited on the anode, is deposited in a matrix of the second anionic polymer.

9. A method according to claim 7 wherein the first polymer comprises a nucleic acid molecule.

10. A method according to claim 1 further comprising a step of removing the anode plate from the cell, and installing it in a field emission device.

\* \* \* \* \*